United States Patent [19]

Titli et al.

[11] Patent Number: 5,483,450
[45] Date of Patent: Jan. 9, 1996

[54] APPARATUS FOR CONTROLLING A SUSPENSION SYSTEM DISPOSED BETWEEN A WHEEL AND THE BODY OF AN AUTOMOTIVE VEHICLE

[75] Inventors: Andre Titli, Balma; Samir Roukieh, Toulouse Cedex, both of France

[73] Assignee: Siemens Automotive S.A., Toulouse, France

[21] Appl. No.: 234,242

[22] Filed: Apr. 28, 1994

[30] Foreign Application Priority Data

Apr. 28, 1993 [FR] France .................................. 93 05007

[51] Int. Cl.$^6$ .................................................. B60G 17/00
[52] U.S. Cl. .................... 364/424.05; 280/840; 280/707; 180/41
[58] Field of Search .................... 364/424.05, 424.01, 364/426.04, 565; 395/1, 3, 60, 61, 900, 905; 280/707, 703, 840, 6.1, 43; 180/170, 41; 73/9

[56] References Cited

U.S. PATENT DOCUMENTS

| | | | |
|---|---|---|---|
| 4,841,815 | 6/1989 | Takahashi | 74/866 |
| 4,999,777 | 3/1991 | Schussler et al. | 364/424.05 |
| 5,029,328 | 7/1991 | Kamimura et al. | 364/424.05 |
| 5,060,157 | 10/1991 | Tado et al. | 364/424.05 |
| 5,138,554 | 8/1992 | Wada | 280/707 |
| 5,159,555 | 10/1992 | Wada | 364/424.05 |
| 5,174,598 | 12/1992 | Sato et al. | 280/707 |
| 5,295,705 | 3/1994 | Butsuen et al. | 280/707 |
| 5,342,079 | 8/1994 | Buma | 280/707 |
| 5,346,242 | 9/1994 | Karnopp | 280/707 |

FOREIGN PATENT DOCUMENTS

| | | |
|---|---|---|
| 0385723 | 9/1990 | European Pat. Off. . |
| 0425199 | 5/1991 | European Pat. Off. . |
| 2687201 | 8/1993 | France . |
| 90/05646 | 5/1990 | WIPO . |
| 91/08120 | 6/1991 | WIPO . |
| 91/17069 | 11/1991 | WIPO . |

OTHER PUBLICATIONS

"Adaptive Fuzzy Controller Improves Comfort", L. Peters et al., pp. 512–515, IEEE Mar. 1993.
Patent Abstract of Japan No. 62–023805 (Furukawa Masazumi), Jul. 3, 1987.
Patent Abstract of Japan No. 63–296512 (Tomoyuki Inoue) May 30, 1990.
Japanese Patent Abstract No. 2–270619 (Tado), dated Nov. 5, 1990.
Japanese Patent Abstract No. 3–258650 (Nishiwaki), dated Nov. 18, 1991.
"Automotive Electronics in Passenger Cars", Numazawa, dated Oct. 17/18, 1988, pp. 11–24.

Primary Examiner—Gary Chin
Assistant Examiner—Tan Q. Nguyen
Attorney, Agent, or Firm—Herbert L. Lerner; Laurence A. Greenberg

[57] ABSTRACT

An apparatus for controlling a suspension system disposed between a wheel and a body of an automotive vehicle, has a device for adjusting a response of the suspension system to mechanical excitations transmitted by the body and/or the wheels. A first controller is sensitive to a vertical speed and a vertical acceleration of the vehicle body, for developing a first virtual control signal of the adjusting device which is suitable for optimizing a ride of the vehicle. A second controller is sensitive to a deflection of the wheel and a vertical speed of the wheel relative to the ground, for developing a second virtual control signal of the adjusting device which is suitable for optimizing contact between the wheel and the ground. A supervising device is sensitive to the first and second virtual control signals for developing a real control signal which is applied to the adjusting device for adjusting the response of the suspension system as a function of a predetermined behavior strategy.

10 Claims, 3 Drawing Sheets

| $V_R$ \ $D_R$ | NG | NM | NP | ZE | PP | PM | PG |
|---|---|---|---|---|---|---|---|
| NG | NG | NG | NG | NG | NM | NP | ZE |
| NM | NG | NG | NM | NP | NP | ZE | PP |
| NP | NG | NM | NM | NP | ZE | P | PM |
| ZE | NG | NP | NP | ZE | PP | PM | PG |
| PP | NM | NP | ZE | PP | PM | PM | PG |
| PM | NP | ZE | PP | PM | PM | PB | PB |
| PG | ZE | PP | PM | PG | PG | PG | PG |

| $V_C$ \ $\Gamma_C$ | NG | NM | NP | ZE | PP | PM | PG |
|---|---|---|---|---|---|---|---|
| NG | PG | PG | PG | PG | PM | PP | ZE |
| NM | PG | PG | PM | PP | PP | ZE | NP |
| NS | NG | PM | PM | PP | ZE | NP | NM |
| ZE | NG | PP | PP | ZE | NP | NM | NG |
| PP | NM | PP | ZE | NP | NM | NG | NG |
| PM | NP | ZE | NP | NM | NG | NG | NG |
| PG | ZE | NP | NM | NG | NG | NG | NG |

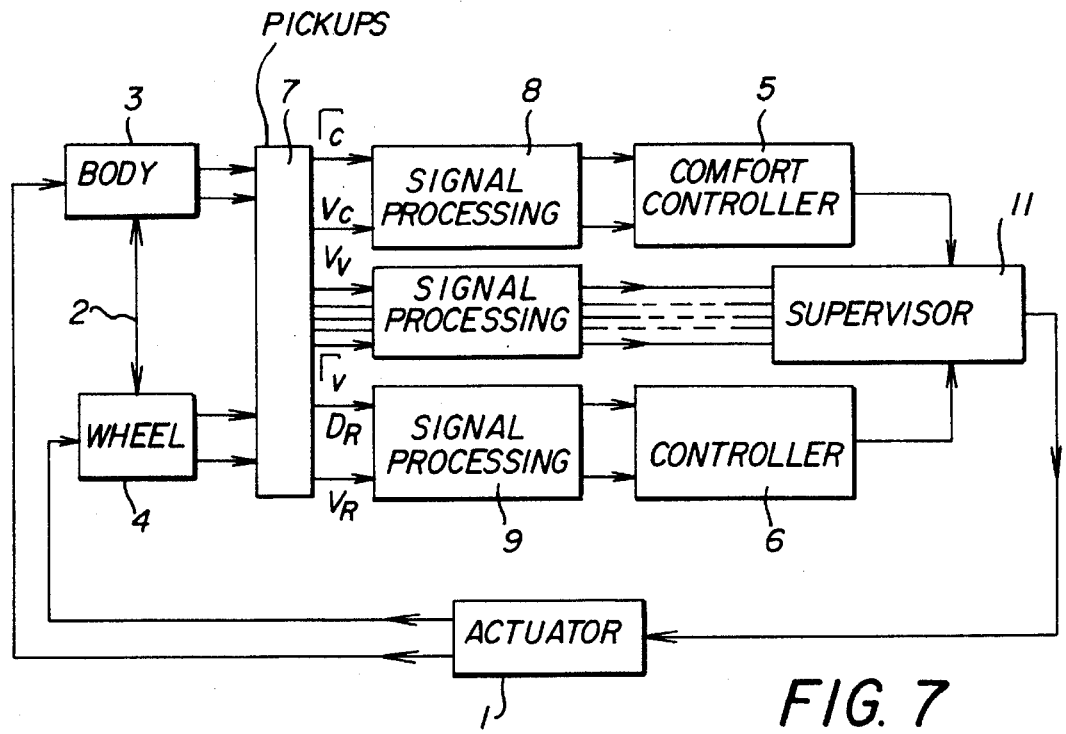
FIG. 7
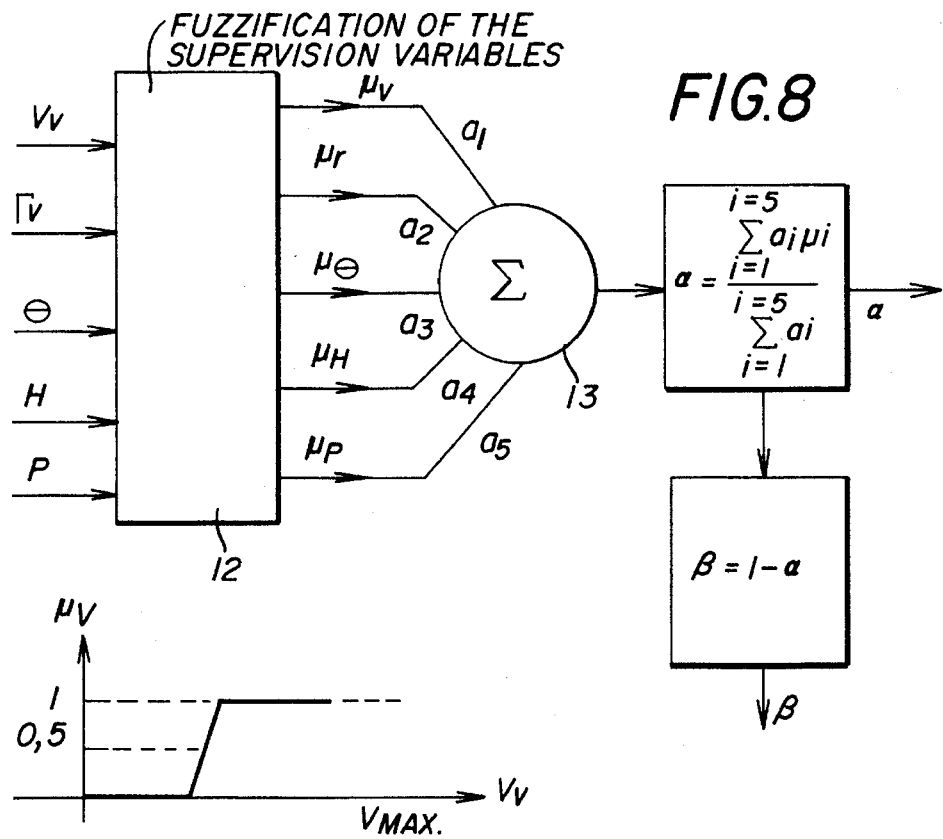
FIG. 8
FIG. 9

APPARATUS FOR CONTROLLING A SUSPENSION SYSTEM DISPOSED BETWEEN A WHEEL AND THE BODY OF AN AUTOMOTIVE VEHICLE

BACKGROUND OF THE INVENTION

FIELD OF THE INVENTION

The present invention relates to an apparatus for controlling a suspension system disposed between a wheel and the body of an automotive vehicle, and more particularly to such an apparatus being provided with means for adjusting a response of the suspension system to mechanical excitations transmitted by the wheels and/or the body.

Conventionally, a suspension system includes a spring and a shock absorber, which are disposed in parallel between a suspended mass, that is the vehicle body, and a mass constituted by a wheel equipped with a tire and its suspension arm, which is excited by irregularities in the surface on which the vehicle travels. The role of the shock absorber is to absorb the energy stored in that system of masses and elastic devices in order to prevent that energy from causing oscillation of the body that is detrimental to the comfort of the passengers, and oscillation of the wheels that is detrimental to the wheel/ground contact and therefore to the safety of the passengers.

Such a system has two resonant frequencies, which are currently located in the band from 1 to 2 Hz for the body and the band from 10 to 15 Hz for the wheel and its suspension arm. French Patent Application No. 92 01450, filed Feb. 10, 1992 by the present applicant, describes a method for controlling the shock absorption coefficient of the shock absorber of a suspension system, which is embodied in such a way as not to degrade the filtering capacity of the system for frequencies other than the aforementioned resonant frequencies. However, that method is still of the type that employs a single control strategy, which is unique to the shock absorber, and entails a compromise between the two dynamics of the suspension system, which are characterized by the aforementioned two resonant frequencies. Therefore, control strategies that are as flexible as desired, which are embodied by a set of rules, such as "if the vehicle speed is high, then vehicle safety is overriding", cannot be employed.

SUMMARY OF THE INVENTION

It is accordingly an object of the invention to provide an apparatus for controlling a suspension system disposed between a wheel and the body of an automotive vehicle, which overcomes the hereinafore-mentioned disadvantages of the heretofore-known devices of this general type and which enables self-adaptation of the control to assemblies with overriding rules, as a function of changes in the rolling conditions and/or the operation of the vehicle, or comfort or passenger safety.

With the foregoing and other objects in view there is provided, in accordance with the invention, an apparatus for controlling a suspension system disposed between a wheel and a body of an automotive vehicle, more particularly having means for adjusting a response of the suspension system to mechanical excitations transmitted by the body and/or the wheels, comprising a first controller being sensitive to a vertical speed and a vertical acceleration of the vehicle body, for developing a first virtual control signal of the adjusting means being suitable for optimizing a ride of the vehicle; a second controller being sensitive to a deflection of the wheel and a vertical speed of the wheel relative to the ground, for developing a second virtual control signal of the adjusting means being suitable for optimizing contact between the wheel and the ground; and supervising means being sensitive to the first and second virtual control signals for developing a real control signal being applied to the adjusting means for adjusting the response of the suspension system as a function of a predetermined behavior strategy.

Due to the use of two controllers in accordance with each of the two dynamics characterized by the two aforementioned resonant frequencies according to the invention, one escapes the constraints that resulted in the prior art from adopting a single control strategy requiring a compromise to be made between these two dynamics.

In accordance with another feature of the invention, the supervising means of the apparatus include means for developing the wheel control signal by linear combination of the first and second virtual control signals.

In accordance with a further feature of the invention, the supervising means include means for calculating coefficients of the linear combination from variables that are representative of the dynamic behavior of the vehicle.

In accordance with an added feature of the invention, the first controller and the second controller are constructed in order, by fuzzy logic, to process input parameters that have been fuzzified beforehand.

In accordance with an additional feature of the invention, the supervising means are constructed for processing, by fuzzy logic, the fuzzified signals developed by the first and second controllers.

In accordance with a concomitant feature of the invention, the same is also true for the means for calculating the coefficients of the linear combination, advantageously drawing them from measurements of variables representing the dynamic behavior of the vehicle, after prior fuzzification thereof.

Through the use of fuzzy logic, one escapes from the constraints presented by the conventional compromise mentioned above. This logic in fact enables self-adaptation of the principles of controlling shock absorption and stiffness of the suspension system as a function of the rolling conditions and vehicle operation conditions. As will be seen below, fuzzy logic further offers the advantage of enabling easy setup of a discrete control of actuators that make it possible to vary the characteristics of the suspension system (stiffness, shock absorption).

Other features which are considered as characteristic for the invention are set forth in the appended claims.

Although the invention is illustrated and described herein as embodied in an apparatus for controlling a suspension system disposed between a wheel and the body of an automotive vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a function diagram of a second embodiment of the apparatus of the present invention;

FIG. 8 is a function diagram of a fuzzy supervisor incorporated in the apparatus of FIG. 7; and FIG. 9 shows a membership function that can be used in the supervisor of FIG. 8.

DESCRIPTION OF THE PREFERRED EMBODIMENTS

Figure 1:
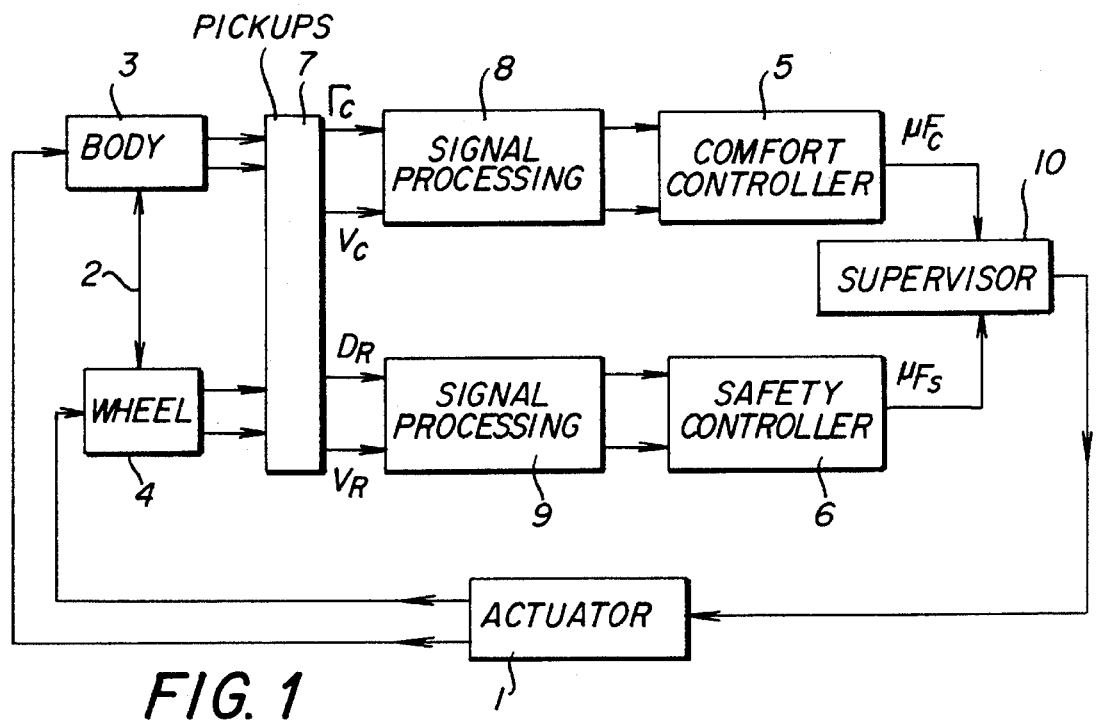
FIG. 1 is a function diagram of a first embodiment of the apparatus of the present invention.

Referring now to the figures of the drawing in detail and first, particularly, to FIG. 1 thereof, it is seen that the apparatus of the invention is constructed to control an actuator 1, such as a shock absorber, forming part of a suspension system which is diagrammatically represented by a double arrow 2, that is placed between a body 3 and a wheel 4 of an automotive vehicle, for instance. Shock absorbers of this kind are known to be provided with means for adjusting their shock absorption coefficient, by varying a throttle cross section of a fluid passage causing two fluid chambers, which are separated by a piston being movable in a cylinder, to communicate with one another. The piston and the cylinder are respectively mechanically coupled to the body and to the wheel, or vice versa. Therefore, the object of the apparatus of the invention is to develop a signal for controlling these adjusting means. It is understood that the invention is not limited to this application, which is given solely by way of example. For instance, the mechanical characteristics of the suspension system could be varied by varying the stiffness of a spring being conventionally mounted in parallel on the shock absorber, or by varying the shock absorption coefficient of this shock absorber. In a further variant, both the stiffness of the spring and the shock absorption coefficient of the shock absorber could be varied at the same time.

In an important characteristic of the apparatus of the invention, the real control signal of the actuator 1 is developed on the basis of virtual control signals furnished by respective first and second control means that are referred to as controllers 5 and 6 which are respectively supplied with signals representing the dynamic behavior of the body and the wheel.

In order to represent the dynamic behavior of the body, its vertical acceleration $\Gamma_C$ and its vertical speed $V_C$ are thus chosen. It will be appreciated that these variables are highly representative of the vertical motions of the body and therefore of the dynamic behavior thereof that determines the comfort of the passengers in the vehicle. This dynamic behavior is characterized by a resonant frequency on the order of 1 to 2 Hz, being spaced apart by one order of magnitude from that of the wheel (approximately 10 to 15 Hz), as has been explained in the introduction to the instant application. For this reason, in the present invention, two distinct specialized controllers are used, each developing virtual control orders that take into account only one of the two dynamic behaviors. These control orders are then combined to develop a real control signal for the actuator 1 that favors either passenger comfort or passenger safety. One thus has a great deal of flexibility available in the choice of control strategies, as will be seen below.

Therefore, besides the comfort controller 5, the apparatus of the invention thus includes a safety controller 6 that is sensitive to the dynamic behavior of the wheel relative to the ground. The permanence of a wheel to ground contact without slip is essential to keeping the vehicle steerable, as is well known. According to the invention, a vertical component $V_R$ of the wheel speed and a distance between its axle and the ground, which can be achieved by a deflection $D_R$ of the tire with which the wheel is equipped, are chosen to represent the dynamic behavior of the wheel.

The apparatus according to the invention thus includes a group 7 of pickups of known types, which furnish signals representing the variables $\Gamma_C$, $V_C$, $V_R$, $D_R$, where the pairs of signals $\Gamma_C$, $V_C$ and $V_R$, $D_R$ are shaped and filtered in respective conventional signal processing blocks 8 and 9 before being furnished to the respective controllers 5 and 6. The deflection $D_R$ is drawn from a distance pickup of the ultrasonic type, for instance, or from a calculation that uses the vertical accelerations of the body and the wheel.

The apparatus of the invention also includes supervising means 10, which are referred to below as a supervisor, that are sensitive to the first and second virtual control signals produced by the respective controllers 5 and 6 for developing a real control signal applied to the adjusting means of the actuator 1, so as to adjust the response of the suspension system as a function of a predetermined behavior strategy.

Furthermore, according to the invention, the wheel control signal results from a linear combination of the output signals of the controllers 5 and 6, implemented by the supervisor. The relative influence of the virtual control signals on the final real control signal is weighted, in such a way as to employ one or another chosen control strategy, for instance favoring reinforcement of passenger safety to the detriment of their comfort, or vice versa.

In order to do so, the invention proposes making use of the particular advantageous characteristics of what is known as fuzzy logic, that is its capacity of implementing sets of behavior rules drawn from experience by one skilled in the art, without these rules requiring mathematical formalization of the relationships linking various parameters representing the dynamic behavior of the suspension system that is to be controlled. For this reason, for example, a rule such as "the higher the vehicle speed, the more the control of the suspension system tends to reinforce passenger safety" can be implemented, which in turn increases the influence of the output of the controller 6 on the control of the adjusting means of the actuator 1.

Figure 2:
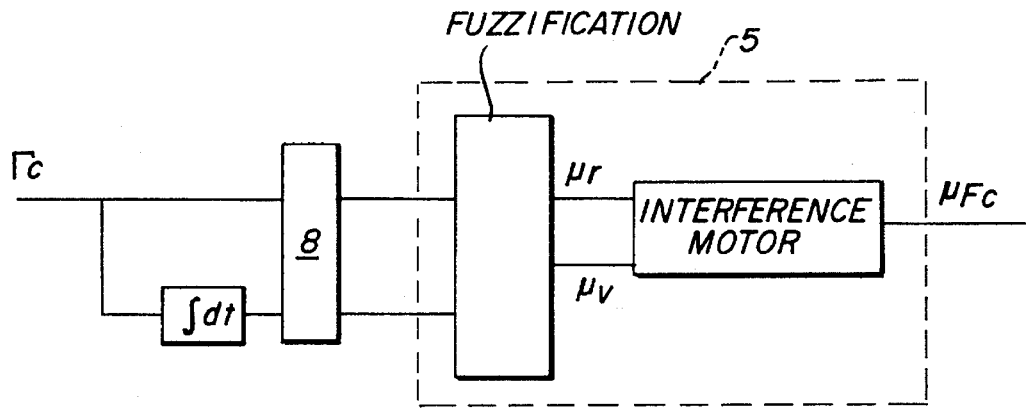
FIG. 2 is a function diagram of a controller incorporated in the apparatus of FIG. 1.

The above will be explained below by describing the structure and operation of one of the controllers 5, 6, since the function of the other is based on the same principles. Therefore, FIG. 2 shows a function diagram of the comfort controller 5, which is also referred to as the slow controller, because the dynamic of the body 3 that it controls is characterized by a resonant frequency which is less by an order of magnitude than that of the dynamic of the wheel 4.

Figure 3:
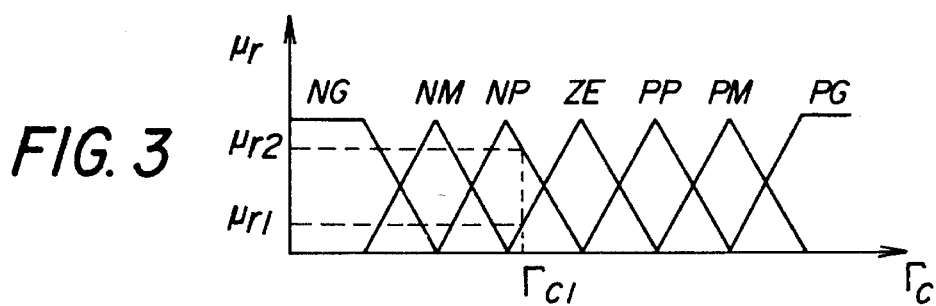
FIG. 3 shows graphs of a plurality of membership functions of fuzzy variables associated with an equal number of membership classes of these variables, being used for fuzzifying input variables processed in fuzzy controllers that can be incorporated in the apparatus of FIG. 1.

Once the acceleration $\Gamma_C$ of the body has been measured with the aid of an accelerometer, the corresponding speed $V_C$ can be drawn by integration. After processing in the signal processing block 8, the signals are captured by the controller 5, which first fuzzifies them. In order to do so, the instantaneous value of a variable parameter $\Gamma_C$ or $V_C$ is converted into a set of degrees of membership in membership classes defined by the membership functions represented in the graph of FIG. 3. By way of example, in this figure the fuzzifying of the variable $\Gamma_C$, which is the body acceleration, is illustrated, with it being understood that fuzzification of the other variables mentioned above, $V_C$, $D_R$, $V_R$, functions in the same way and does not require particular description.

Fuzzification requires a division of the variation interval of the variable $\Gamma_C$ or discourse universe, to use the terminology of fuzzy logic, into a plurality of membership classes NG, NM, NP, ZE, PP, PM, and PG, which can partly overlap, as is shown in the drawing. Therefore, the classes NG (high negative), NM (mean negative), NP (low negative), ZE (zero), PP (low positive), PM (mean positive) and PG (high positive) cover overlappingly consecutive subintervals of the interval of variation of the variable $\Gamma_C$. In each membership class, a membership function is defined, which is triangular, symmetrical, and centered on each field as shown, or has any other suitable form well known in fuzzy logic, with each function varying between 0 and 1. Therefore, an instantaneous value $\Gamma_{C1}$ of the variable $\Gamma_C$ is converted into a fuzzy variable having a degree of membership $\mu_{\Gamma_1}$ in class ZE and $\mu_{\Gamma_2}$ in class NP.

After fuzzification of the variables $\Gamma_C$ and $V_C$, it is possible to apply a set of rules to them, as mentioned above with respect to reinforcing vehicle safety when the vehicle speed increases, which can be done from experience by one skilled in the art. This set of rules is embodied by the table in FIG. 5, with a double input of fuzzified variables $\Gamma_C$, $V_C$. Therefore, depending on the degree of membership of the variable $\Gamma_C$ in class NP and of the variable $V_C$ in class ZE, the table indicates that the fuzzified output signal of the controller 5 belongs to class PP (low positive). The output signal of the controller 5 thus takes the form of a vector $\mu_{FC}$ constituted by two degrees of membership of a fuzzy output variable $F_C$ of the controller in the membership classes defined in the table in FIG. 5 by the two pairs of membership classes of the input variables $\Gamma_C$ and $V_C$.

Figures 4, 5, 6:
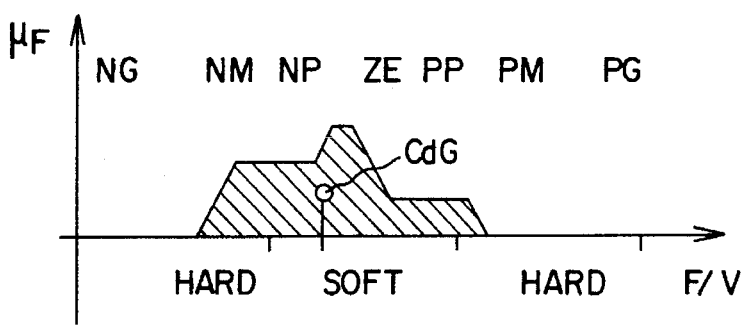
FIGS. 4 and 5 are tables that embody sets of characteristic rules employed by a respective fuzzy safety controller and a fuzzy comfort controller that can be used in the apparatus of FIG. 1.
FIG. 6 is a graph illustrating the defuzzification of the output of a supervisor forming part of the apparatus of FIG. 1, for developing a control signal for an actuator that varies the characteristics of stiffness and/or shock absorption of a suspension system controlled by the apparatus of the invention.

The safety controller 6 has an analogous structure and function and likewise furnishes a vector $\mu_{FS}$ drawn from a set of rules embodied by the table in FIG. 4.

The vectors thus formed are furnished to the supervisor 10, having a function which is to deduce from them an appropriate control vector $\mu_F$ of the actuator 1, by combining these vectors. In a particularly simple strategy, the combination is of the following form:

$$\mu_F = \alpha \cdot \mu_{FC} + \beta \cdot \mu_{FS}$$

where $\alpha + \beta = 1$.

If passenger comfort is to be given priority, then the coefficient $\alpha$ is reinforced at the expense of the coefficient $\beta$, by choosing the following values, for example:

$\alpha = 0.6$ $\beta = 0.4$.

In the case of a sports car running at high speed, the influence of the safety controller 6 is reinforced to increase roadholding, by choosing the following values, for example:

$\alpha = 0.3$ $\beta = 0.7$.

The fuzzy vector $\mu_F$ which is thus obtained and defined in the discourse universe covered by the membership classes NG–PG must be defuzzified in order for the supervisor to produce a predetermined signal which is suitable for controlling the means for adjusting the shock absorption coefficient of a shock absorber, for example being made up of a piston sliding in a cylinder in which it defines two chambers for a fluid that can pass from one chamber to the other through a conduit equipped with means for adjusting a restriction. The shock absorption coefficient corresponds to a ratio between a force F withstood by the shock absorber at a relative speed V of the piston in the cylinder and a graph of a function F(V) constitutes the characteristic of the shock absorber. This characteristic currently includes a central straight portion, centered on the origin of the coordinates and with a slope characterizing the shock absorption coefficient of the shock absorber, and two straight portions of lesser slope, extending the two ends of the central portion. A typical adjustable shock absorber may have at least two characteristics F(V) that are distinguished essentially by the slope in the central portion. When the slope is slight, the shock absorber is classified as soft, while if this slope is pronounced, the shock absorber is classified as hard, to use the terminology employed on the F/V axis of FIG. 6.

In this drawing figure, a conventional method for defuzzifying the vector $\mu_F$ has been illustrated and is defined in a discourse universe made up of membership classes NG–PG that are distributed along an axis which is parallel to the axis F/V. By way of example, this method includes clipping the peaks in the membership functions of the force F to the value of their degree of membership in the associated membership class, and determining a center of gravity CdG of the surface (shown shaded in FIG. 6) defined between the peak-clipped membership functions and the zero ordinate axis of the graph of these functions. The abscissa of the center of gravity falls strongly within one of the three zones marked hard, soft, hard, which precisely defines the characteristic of the shock absorber that the control apparatus according to the invention is intended to establish.

A second embodiment of the apparatus according to the invention is shown in FIG. 7. It includes a supervisor 11 that develops a finer control strategy than that of FIG. 1. In both of these drawing figures, identical reference numerals identify the elements or devices that are identical or similar.

Therefore, the supervisor 11 of the apparatus of FIG. 7 handles data relating to the behavior of the entire vehicle, such as the speed $V_V$ and the acceleration $\Gamma_V$ of the vehicle, the angle of orientation $\Theta$ of the front wheels of the vehicle, the height H of the vehicle body, the pressure P of the brake fluid, and so forth, as has been shown in the function diagram of the supervisor 11 in FIG. 8.

That diagram involves variables which, when they approach their upper limit, compel reinforcement of vehicle safety, and therefore compel control by the actuator of the suspension system under the preponderant influence of the safety controller. This control thus hardens the suspension at the expense of passenger comfort, to reinforce vehicle roadholding.

This concern for safety is taken into account in the fuzzification of these variables (at reference numeral 12 in FIG. 8) by adopting membership functions for them that have the course which is shown in FIG. 9, that is used to fuzzify the vehicle speed $V_V$. In the case of this fuzzification, it will be assumed that the range of values that can be assumed by the variable in question ("discourse universe") can be divided into two complementary membership classes, that is comfort and safety. In FIG. 9, the membership function of the variable $V_V$ has been shown in the safety class. This makes it possible to deduce the degree of membership $\mu_v$ of the variable $V_V$ in the safety class, and the degree of membership in the comfort class is deduced from it by complementation to one.

According to the invention, degrees of membership $\mu_i$ of the fuzzified variables (where $\mu_i = \mu_V, \mu_\Gamma, \mu_\Theta, \mu_H, \mu_P$) and weighting coefficients $a_i$ which are attached to each degree of membership are used for calculating the values for the coefficients $\alpha$ and $\beta$ defined above in conjunction with the description of the apparatus of FIG. 1, in order to combine the outputs $\mu_{FC}$ and $\mu_{FS}$ of the controllers 5 and 6. Therefore one chooses the following:

$$\beta = \frac{\Sigma a_i \mu_i}{\Sigma a_i}$$

$$\alpha = 1 - \beta$$

where $\beta$ is calculated in an adder-weighter 13 forming part of the supervisor 11. The latter finally calculates the control order $\mu_F = \alpha \cdot \mu_{FC} + \beta \cdot \mu_{FS}$ of the actuator 1, as described above.

It will be noted that this apparatus advantageously adapts to numerous types of pickups and actuators by simply changing the tables for fuzzifying the measurements furnished by the pickups, or the conversion table for the fuzzy control value $\mu_F$ resulting in a real control signal for the actuator. Accordingly, as described in conjunction with FIG. 6, an actuator of the shock absorber type which two discrete positions can be replaced by an actuator with continuous variation of the shock absorption coefficient, for example, or even by an actuator of a different type, such as a spring of variable stiffness.

The result of this method is that only the controllers 5 and 6 are attached to a particular suspension system, or in other words to a vehicle wheel and to the corresponding part of the body. Various architectures of the apparatus according to the invention are then possible, and then in particular the architecture in which a single supervisor computer is used for the four suspension systems of a conventional four-wheeled automobile. In a variant, the supervisor may be adapted to calculate different sets of coefficients ($\alpha$, $\beta$) for each suspension system, as a function of its position (right front, left front, right rear, left rear), by way of weighting coefficients $a_i$ of the global variables of the vehicle that are particular to each suspension system. The safety/comfort weighting characteristics associated with each system are then furnished to elementary adders that are particular to each system.

It is understood that the invention is not limited to the embodiments described and shown, which are given solely by way of example. In particular, the various computers (controllers, supervisors) of all of the suspension systems may be integrated into the same physical unit, in order to permit sharing of common physical resources such as microprocessors, memories, and components associated with them, while as has been seen in the introduction to the instant application, the frequencies of the phenomena to be controlled are different.

We claim:

1. In an apparatus for controlling a suspension system disposed between a wheel and a body of an automotive vehicle, having means for controlling the response characteristics of the suspension system to mechanical excitations transmitted by at least one of the body and the wheels, the improvement which comprises:

a) a first controller receiving first sensor signals representing a vertical speed and a vertical acceleration of the vehicle body, said first controller developing, from the first sensor signals, a first virtual control signal of the controlling means for optimizing a ride quality of the vehicle;

b) a second controller receiving second sensor signals representing a deflection of the wheel and a vertical speed of the wheel relative to the ground, said second controller developing, from the second sensor signals, a second virtual control signal of the controlling means for optimizing contact between the wheel and the ground; and c) supervising means being sensitive to the first and second virtual control signals for developing a real control signal being applied to the controlling means for adjusting the response characteristic of the suspension system as a function of a predetermined behavior strategy, said supervising means including means for developing the real control signal by a linear combination of the first and second virtual control signals.

2. The apparatus according to claim 1, wherein said supervising means include means for receiving variables being representative of a dynamic behavior of the vehicle, the variables representing a speed and acceleration of the vehicle, a vertical height of the body and a steering angle of front wheels of the vehicle, and means for calculating coefficients of the linear combination from the variables.

3. The apparatus according to claim 2, wherein said first controller and said second controller are constructed for processing, by fuzzy logic, the first and second set of variables having been fuzzified beforehand.

4. The apparatus according to claim. 3, wherein said means for calculating the coefficients operate on the variables representing the dynamic behavior of the vehicle, after prior fuzzification thereof.

5. The apparatus according to claim 2, including a plurality of suspension assemblies for as many wheels as there are on the vehicle, said supervising means being associated with all of said suspension assemblies and being combined in hardware terms in a single computer, and said computer performing a wheel by wheel processing of the variables being handled in order for calculating the coefficients of the linear combination of the first and second virtual control signals, and a local adder performing the combination.

6. The apparatus according to claim 1, wherein said first controller and said second controller are constructed for processing, by fuzzy logic, input parameters having been fuzzified beforehand.

7. The apparatus according to claim 6, wherein said supervising means are constructed for processing the fuzzified signals developed by said first and second controllers, by fuzzy logic.

8. The apparatus according to claim 6, wherein the first virtual control signal is drawn from a set of rules defined by the following table:

| | | | | $\Gamma_c$ | | | |
|---|---|---|---|---|---|---|---|
| Vc | NG | NM | NP | ZE | PP | PM | PG |
| NG | PG | PG | PG | PG | PM | PP | ZE |
| NM | PG | PG | PM | PP | PP | ZE | NP |
| NS | NG | PM | PM | PP | ZE | NP | NM |

-continued

| | Γc | | | | | | |
|---|---|---|---|---|---|---|---|
| Vc | NG | NM | NP | ZE | PP | PM | PG |
| ZE | NG | PP | PP | ZE | NP | NM | NG |
| PP | NM | PP | ZE | NP | NM | NG | NG |
| PM | NP | ZE | NP | NM | NG | NG | NG |
| PG | ZE | NP | NM | NG | NG | NG | NG | and by predetermined functions of membership of the variables to respective membership classes, wherein instantaneous values of the variables determine rules of the table conditioning membership of the first virtual control signal in at least one membership class.

9. The apparatus according to claim 6, wherein the second virtual control signal is drawn from a set of rules defined by the following table:

| | $D_R$ | | | | | | |
|---|---|---|---|---|---|---|---|
| $V_R$ | NG | NM | NP | ZE | PP | PM | PG |
| NG | NG | NG | NG | NG | NM | NP | ZE |

-continued

| | $D_R$ | | | | | | |
|---|---|---|---|---|---|---|---|
| $V_R$ | NG | NM | NP | ZE | PP | PM | PG |
| NM | NG | NG | NM | NP | NP | ZE | PP |
| NP | NG | NM | NM | NP | ZE | P | PM |
| ZE | NG | NP | NP | ZE | PP | PM | PG |
| PP | NM | NP | ZE | PP | PM | PM | PG |
| PM | NP | ZE | PP | PM | PM | PB | PB |
| PG | ZE | PP | PM | PG | PG | PG | PG | and by predetermined functions of membership of the variables to respective membership classes, wherein instantaneous values of the variables determine rules of the table conditioning the membership of the second virtual control signal in at least one membership class.

10. The apparatus according to claim 1, including a plurality of suspension assemblies for as many wheels as there are on the vehicle, said supervising means being associated with all of said suspension assemblies and being combined in hardware terms in a single computer.

* * * * *